United States Patent [19]
Sweany et al.
[11] 4,142,186
[45] Feb. 27, 1979

[54] MEANS FOR IMPROVING THE ELECTROACOUSTICAL PROPERTIES OF A BUZZER

[75] Inventors: Louis P. Sweany, Carmel; Michael T. Burk, Indianapolis, both of Ind.

[73] Assignee: P. R. Mallory & Co., Inc., Indianapolis, Ind.

[21] Appl. No.: 820,551

[22] Filed: Aug. 1, 1977

[51] Int. Cl.$^2$ .............................................. G01K 9/12

[52] U.S. Cl. .................................... 340/388; 340/401; 340/402

[58] Field of Search ............... 340/388, 389, 390, 391, 340/401, 402

[56] References Cited

U.S. PATENT DOCUMENTS 3,408,645 10/1968 Doggart .............................. 340/388
3,517,390 6/1970 Whitehead .......................... 340/388
3,656,156 4/1972 Berns .................................. 340/388

*Primary Examiner*—Harold I. Pitts
*Attorney, Agent, or Firm*—Hoffmann, Meyer & Coles

[57] ABSTRACT

The electroacoustical properties of an electromechanical vibrating device for producing an audible signal are improved by attenuating undesirable frequencies of the audible signal to produce a predominant frequency and by accentuating the predominant frequency. The improvement includes a planar vibration diaphram comprised of a plastic polymer material, a vibrating striking member positioned to strike the vibration diaphram at its center; a bumper comprised of resilient material interposed between the vibrating striking member and the vibration diaphram, and a resonant chamber in spaced relation to the vibration diaphram having a resonant frequency substantially equal to the predominant frequency.

10 Claims, 3 Drawing Figures

MEANS FOR IMPROVING THE ELECTROACOUSTICAL PROPERTIES OF A BUZZER

BACKGROUND OF THE INVENTION

1. Field of the Invention

This invention in general relates to buzzers of the type in which a striking member is excited by an electromagnet and a vibration diaphram is struck by the excited striking member thereby producing an audible signal.

Generally speaking, the present invention includes means for improving the electroacoustical properties of a buzzer as described above which attenuates undesirable frequencies of the audible signal thereby producing a predominant signal frequency and accentuates the predominant frequency by utilizing a resonant chamber having a resonant frequency substantially equal to the predominant frequency of the audible signal.

2. Description of the Prior Art

In a conventional buzzer of the type which includes a striking member and means for vibrating the striking member an audible signal is generally produced by the vibrating striking member striking some type of a vibration diaphram. Typically, the striking of a vibration diaphram comprised of a metal, such as is taught in U.S. Pat. No. 3,760,411 has resulted in a complex series of vibrational modes containing a wide spectrum of frequencies which produces an unpleasant audible signal. As exemplified by U.S. Pat. No. 3,564,542, efforts have been made to improve the electroacoustical properties of the conventional electromechanical vibrating buzzer. These efforts have included the use of a vibration diaphram comprised of a plastic film and/or the shaping of either plastic or metal vibration diaphrams to accentuate the acoustic response of the buzzer. While these improvements have produced buzzers with improved electroacoustical qualities, it is in many instances desirable to reduce the "noise" factor associated with such buzzers to obtain an audible signal which is even less irritating and more aesthetically pleasing. A typical instance where a more aesthetically pleasing audible signal is desired is the use of such buzzers in automobiles to signal either that a safety belt is unfastened or that keys have been left in the ignition when the driver leaves the automobile.

SUMMARY OF THE INVENTION

In accordance with the present invention in its broadest concept, there is provided means for improving the electroacoustical properties of a conventional buzzer which includes means for attenuating undesirable frequencies to produce an audible signal having a predominant frequency and means for accentuating the predominant frequency of the audible signal.

It is an object of the present invention to obtain a less irritating and more aesthetically pleasing audible signal from a conventional electromechanical vibrating buzzer.

It is another object of the present invention to improve the electroacoustical properties of a conventional electromechanical vibrating buzzer without significantly increasing the material or construction cost of such buzzer.

Still a further object of the present invention is to produce an audible signal from a conventional electromechanical vibrating buzzer having a predominant frequency preferably in the lower, more pleasing frequency range.

Yet another object of the present invention is to accentuate the predominant frequency such that any undesirable frequencies are substantially eliminated in the audible signal of a conventional electromechanical vibrating buzzer.

Other objects and advantages of the present invention will be apparent from the following detailed description of a preferred embodiment thereof, which description should be considered in conjunction with the accompanying drawings in which:

DESCRIPTION OF THE PREFERRED EMBODIMENT

Figure 1:
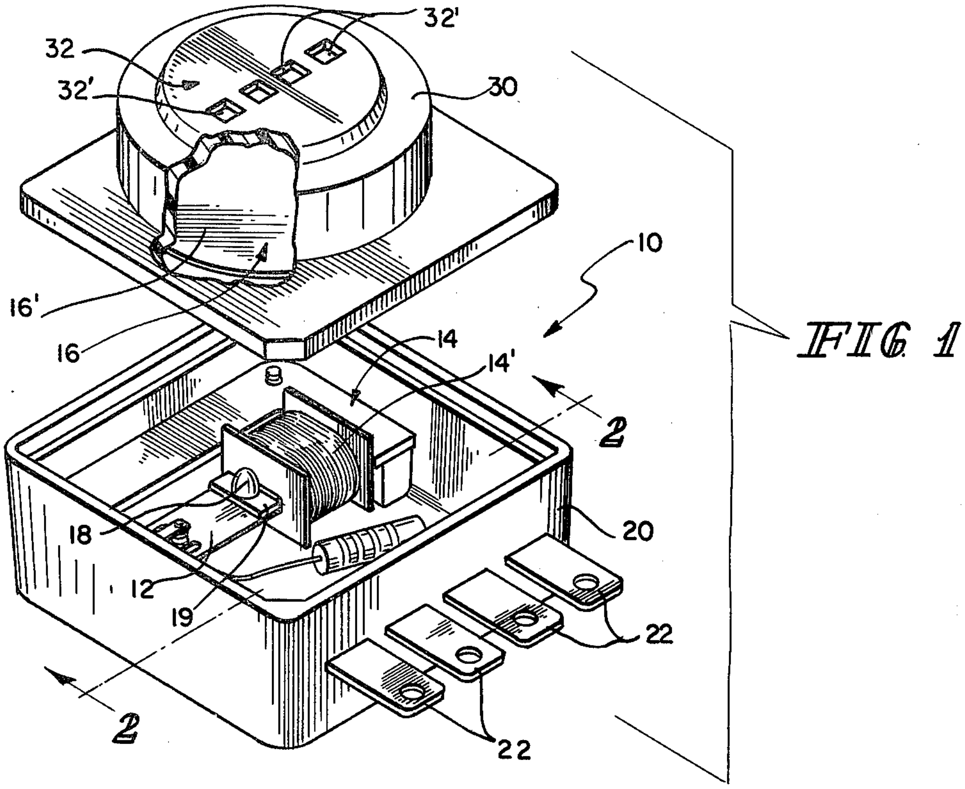
FIG. 1 is an exploded perspective view of a conventional electromechanical vibrating buzzer employing the improvements of the present invention.

Referring now to FIG. 1 there is shown a conventional electromechanical vibrating device 10 for producing an audible signal employing the improvements of the present invention. The conventional electromechanical vibrating device 10 includes a striking member 12, means for vibrating the striking member 14 which may include an electromagnet 14' as shown, and a vibration diaphram 16 in spaced relation to the striking member 12 which when struck by the vibrating striking member 12 produces an audible signal. As illustrated in FIG. 1 the electromechanical vibrating device 10 may be mounted in an acoustically dead housing 20 having electrical leads 22 extending therefrom such that an external source of electrical power (not shown) may be easily coupled to the device 10.

Figure 2:
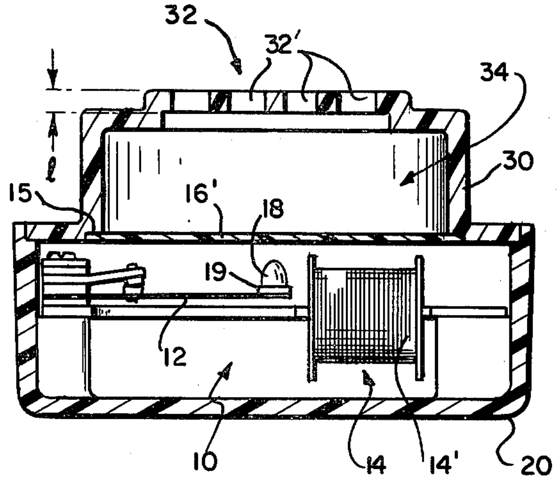
FIG. 2 is a cross-sectional view of FIG. 1 taken along lines 2—2.

Referring to FIGS. 1 and 2, means for improving the electroacoustical properties of the conventional electromechanical vibrating device 10 includes a planar circular vibration diaphram 16' comprised of a plastic polymer material, such as MYLAR, a registered trademark of E.I. DuPont de Nemours & Co.; positioning the striking member 12 such that its strikes the vibration diaphram 16' at its center when vibrated by the electromagnet 14'; a conical bumper 18 comprised of a resilient material, such as neoprene, mechanically coupled to the striking member 12 at a point 19 whereby when the striking member 12 is vibrated the bumper 18 strikes the vibration diaphram 16' at its center, and a resonant chamber 30 in spaced relation to the vibration diaphram 16'.

High frequency noise typically associated with conventional electromechanical vibrating buzzers is attenuated by means of employing a planar circular vibration diaphram 16' comprised of MYLAR, a registered trademark of E.I. DuPont de Nemours & Co., positioning the striking member 12 such that it strikes the vibration diaphram at its center, and employing a conical resilient bumper to strike the vibration diaphram 16' when the striking member 12 is vibrated. All of these features of the present invention serve to minimize the generation of higher noise frequencies and produce a frequency which is predominant to all other frequencies.

The predominant frequency produced by the means for attenuating the undesirable frequencies is then accentuated to substantially eliminate undesirable frequencies by means of the resonant chamber 30. Resonant chamber 30 preferably has a resonant frequency ($f_r$) substantially equal to the predominant frequency produced by the means for attenuating the undesirable frequencies. Accordingly, dimensions for the internal volume 34 and opening 32 of the resonant chamber are substantially determined by the relationship which has been developed for the Helmholtz resonator wherein:

$$f_r = \frac{cr_{eq}}{2}\sqrt{\frac{3}{v(3\pi l + 16r_{eq})}}$$

and $f_r$ = chamber resonant frequency
c = sound velocity
$r_{eq}$ = equivalent radius of chamber opening
v = chamber volume (34 - See FIG. 2)
l = length of chamber opening (See FIG. 2)

As illustrated in FIG. 1 the chamber opening 32 includes four individual openings 32' which serve as an acoustic low pass filter. The total area of opening 32' is substantially representative of a single circular opening having a radius ($r_{eq}$) and a length (l) where such dimensions may be utilized in the above relationship to determine the resonant frequency of the chamber 30. The circular vibration diaphram 16' is mounted at its edge 15 (FIGS. 2 and 3) to the resonant chamber 30 thereby totally closing the end of the chamber 30 opposite the four individual opening 32'.

Figure 3:
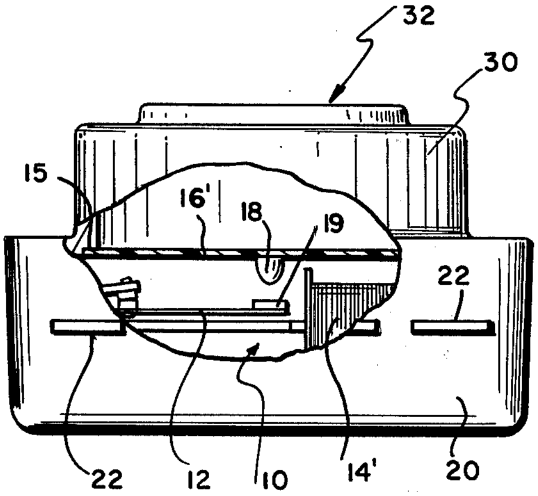
FIG. 3 is a modification of the embodiment of the present invention shown in FIG. 1.

Shown in FIG. 3 is a modification of the attenuating means described hereinabove. In lieu of coupling the resilient bumper 18 to the striking member 12 it may be mechanically coupled to the center of the vibration diaphram 16' such that when the striking member 12 is vibrated, point 19 strikes the conical bumper 18 thereby producing an audible signal having a desired predominant frequency.

As an example of the features of the present invention, we found that an audible signal having a predominant frequency of about 1000 HZ provided a less irritating and more pleasant sound. Referring to FIG. 1, in order to produce an audible signal having a frequency substantially equal to 1000 HZ, a flat circular vibration diaphram 16' comprised of MYLAR, a registered trademark of E.I. DuPont de Nemours & Co., and having a thickness of about 5 mils was utilized. A circular diaphram 16' was selected for its more predictable vibrational characteristics and MYLAR having a thickness of 5 mils was selected for its dimensional stability. It was found that the fundamental vibrational frequency of the vibration diaphram 16' was not particularly critical with the exception that the fundamental vibrational frequency should be less than the desired predominant frequency of 1000 HZ. In fact, it proved desirable to maintain the fundamental vibrational frequency of the vibration diaphram 16' low with respect to the predominant frequency.

In order to accentuate the desired predominant frequency of the audible signal, a resonant chamber 30 was designed with an internal volume 34 (See FIG. 2) and an opening 32 for sound distribution utilizing the relationship for the Helmholtz resonator as a guide, where:

$$f_r = \frac{cr_{eq}}{2}\sqrt{\frac{3}{v(3\pi l + 16r_{eq})}}$$

Within the limitations of product design requirements a chamber 30 was designed having a volume 34 of 7.55 $cm^3$, an opening 32 radius ($r_{eq}$) of 0.358 cm and an opening 32 length (l) of 0.16 cm (See FIG. 2). These dimensions for the resonant chamber 30 when applied to the above formula yielded a chamber resonant frequency ($f_r$) of about 1440 HZ. Acoustic filter response of the resonant chamber 30 was determined by porting the chamber opening 32 as illustrated in FIG. 1 (individual openings 32'). As previously indicated the total area of the individual openings 32' substantially represents a single circular opening 32 having a radius ($r_{eq}$) and a length (l). With the porting of chamber opening 32, the measured resonant frequency of a chamber having the above dimensions was found to be substantially equal to the desired predominant frequency of 1000 HZ.

The flat circular vibration diaphram 16' was edge 15 mounted to the resonant chamber 30 thereby closing the end of the chamber 30 opposite the acoustic filter openings 32'. Accordingly, the vibration diaphram 16' had an operating diameter of about 1.47 cm. Utilizing the formula:

$$f_r = \frac{.467t}{r^2}\sqrt{\frac{Q}{\rho(1-\sigma^2)}}$$

where:

$f_r$ = resonant frequency of a circular disk
t = thickness of the circular disk
r = radius of the circular disk
Q = Young's modulus of elasticity
$\rho$ = density of the material comprising the circular disk
$\sigma$ = Poisson's ratio the fundamental vibrational frequency of the vibration diaphram 16' was calculated to be 155 HZ.

The vibration diaphram 16' assembled to the resonant chamber 30 as described hereinabove was mounted to a conventional electromechanical vibrating buzzer 10 such that the striking member 12 of the buzzer 10 would strike the vibration diaphram 16' at its center. Striking the vibration diaphram 16' off-center resulted in undesirable high frequencies.

We also discovered that striking the vibration diaphram 16' with the hard surface of the striking member 12 as is typically done in conventional vibrating buzzers, produced undesirable high frequencies. Accordingly, a resilient bumper 18 when interposed between the striking member and the vibration diaphram was found to further reduce the undesirable higher frequencies associated with striking the vibration diaphram 16'. A conical bumper 18 comprised of neoprene having a durometer reading of substantially 60 provided another means for reducing the higher frequencies.

Naturally, the final audible signal produced by the electromechanical vibrating buzzer 10 has at least some dependency on the vibrational frequency of the striking member 12. A vibrational frequency of about 300 HZ for the striking member 12 in conjunction with the improvements of the present invention provided a pleasing audible signal.

In view of the above, it can be seen that the several objects of the invention are achieved and other advantageous results attained and that further modifications can be made without departing from the spirit and scope of the invention as defined in the appended claims.

What we claim is:

1. In an electromechanical vibrating device for producing an audible signal, the improvement which comprises: means for attenuating undesirable frequencies of said audible signal wherein said attenuating means includes a circular planar vibration diaphragm comprised of a plastic polymer material, a vibrating striking member positioned to strike said vibration diaphragm at its center, and a conical bumper comprised of resiliant material interposed between said vibrating striking member and said vibration diaphragm.

2. The improvement as recited in claim 1 wherein said bumper is mechanically coupled to said vibrating striking member and strikes said vibration diaphragm to produce said audible signal.

3. The improvement as recited in claim 1 wherein said bumper is mechanically coupled to said vibration diaphragm at its center and said vibrating striking member strikes said bumper to produce said audible signal.

4. The improvement as recited in claim 1 wherein said vibration diaphragm, is composed of MYLAR and has a thickness on the order of 5 mils.

5. The improvement as recited in claim 1 which further includes means for accentuating at least one desirable frequency of said audible signal wherein said desirable frequency is predominant.

6. The improvement as recited in claim 5 wherein said accentuating means includes a resonant chamber in spaced relation to said vibration diaphragm having a resonant frequency substantially equal to said predominant desirable frequency.

7. The improvement as recited in claim 6 wherein said resonant chamber has dimensions substantially determined by the relationship:

$$fr = \frac{cr}{2}\sqrt{\frac{3}{v(3\pi l + 16r)}}$$

and wherein, $f_r$ = chamber resonant frequency
c = sound velocity
r = radius of chamber opening
v = chamber volume
l = length of chamber opening 8. In a method of improving the electroacoustical properties of an electromechanical vibrating device for producing an audible signal, the improvement which comprises the steps of:

(a) attenuating undesirable frequencies of said audible signal by
 1. employing a conical bumper comprised of resilient material and
 2. striking a circular planar vibration diaphragm comprised of plastic polymer material at its center with said conical bumper to produce at least one predominant frequency of said audible signal whereby undesirable noise frequencies associated with striking said vibration diaphragm are attenuated; and (b) accentuating said predominant frequency by
 1. employing a resonant chamber having a resonant frequency substantially equal to said predominant frequency.

9. The improvement as recited in claim 1 wherein said conical bumper is composed of neoprene.

10. In an electromechanical vibrating device for producing an audible signal, the improvement which comprises: means for producing an audible signal having a frequency which is predominant over all other frequencies associated with said signal, said means for producing said audible signal including a circular planar vibration diaphragm comprised of a plastic polymer material, a vibrating striking member positioned to strike said vibration diaphragm at its center, and a conical bumper comprised of a resilient material mechanically coupled to said vibration diaphragm at its center whereby said vibrating striking member strikes said conical bumper thereby attenuating undesirable frequencies associated with striking said vibration diaphragm.

* * * * *